United States Patent [19]
Fielding et al.

[11] Patent Number: 5,424,868
[45] Date of Patent: Jun. 13, 1995

[54] COLOR OPTICAL OUTPUT SYSTEM

[75] Inventors: Raymond G. Fielding, Middleton; John D. Leyland, Oldham, both of United Kingdom

[73] Assignee: Rank Brimar Limited, United Kingdom

[21] Appl. No.: 90,088

[22] Filed: Sep. 16, 1993

[30] Foreign Application Priority Data

Jan. 25, 1991 [GB] United Kingdom ............... 9101714
Jan. 25, 1991 [GB] United Kingdom ............... 9101715

[51] Int. Cl.6 ............................................ G02B 27/14
[52] U.S. Cl. .................................... 359/634; 359/865
[58] Field of Search ............... 359/629, 634, 839, 865, 359/850, 884

[56] References Cited

U.S. PATENT DOCUMENTS

| | | | |
|---|---|---|---|
| 4,680,579 | 7/1987 | Ott | 340/783 |
| 4,983,032 | 1/1991 | Van Den Brandt | 353/30 |
| 5,262,895 | 11/1993 | LaDuke et al. | 359/634 |

FOREIGN PATENT DOCUMENTS

| | | | |
|---|---|---|---|
| 283290 | 9/1988 | European Pat. Off. | H04N 5/74 |
| 363767 | 4/1990 | European Pat. Off. | H04N 9/31 |
| 401912 | 12/1990 | European Pat. Off. | G02F 1/13 |
| 450952 | 10/1991 | European Pat. Off. | G02F 1/135 |

*Primary Examiner*—Georgia Y. Epps
*Assistant Examiner*—Thomas Robbins
*Attorney, Agent, or Firm*—Lerner, David, Littenberg, Krumholz & Mentlik

[57] ABSTRACT

Color optical output apparatus comprising a color dependent mirror and a pair of optical spacial modulator arrays arranged to deflect light incident thereon, the arrangement being such that an incident polychromatic beam is split by said mirror means into two spectral components, one directed to each array, and said mirror means is arranged also to receive and combine deflected beams from each array to produce a combined optical beam, the spectral response of the mirror means being the same during splitting and combining.

14 Claims, 8 Drawing Sheets

COLOR OPTICAL OUTPUT SYSTEM

BACKGROUND OF THE INVENTION

FIELD OF THE INVENTION

This invention relates to a color optical output system of the kind employing spatial light modulators responsive to different color signals to produce separate modulated color component signals which are optically combined to form a color output signal. One example of an application of such a system is in large scale displays as disclosed in our earlier International applications W091/15923, W091/15843 and PCT/GB92/00002 (incorporated herein by reference); another is in color printing.

DESCRIPTION OF THE PRIOR ART

A spatial light modulator is an optical component which is controllable to modulate an incident light beam. A relatively old example is the eidophor, a layer of oil scanned by a cathode ray. One class of spatial light modulators is active matrix devices, comprising a matrix of individually addressed pixel light valves or modulators; the liquid crystal modulator array described in, for example, EP 0401912 is one modulator array of this type. In EP 0401912, a liquid crystal matrix is provided in a light path to variably transmit, and hence amplitude modulate, the incident light beam (without altering its path or optical axis). Another example of such an active matrix is the deformable mirror device (DMD) described in, for example, U.S. Pat. No. 4856863, U.S. Pat. No. 4615595, and U.S. Pat. No. 4596992.

Such devices comprise miniature mirrored cantilever beam elements carrying electrodes so as to be electro statically deflectable between two positions. The extent of the deflection can be controlled by the applied electrostatic potential to provide variable degrees of reflection, or the device can be operated in a binary manner by applying predetermined electro static potentials to switch between discrete deflection states. It thus angularly deflects the incident light beam and hence changes the optical axis of the light beam.

Using an array of such devices, each individually addressable, a two dimensional image can be reproduced by exposing the array to an incident light beam, modulating the incident beam by controlling the individual mirror devices from a picture signal, and collating the beam reflected in a particular direction. The small size and fast switching times of devices of the kind described in the above mentioned patents makes them usable at video picture data rates, enabling the display of television or video moving images on a display screen onto which the collated beam is projected.

The incident beam is not scanned, as is an electron beam, but illuminates the entire device. In order to display a color image, therefore, it is necessary to provide three separately illuminated deflector arrays, one controlled responsively to each primary color or primary color combinations, and to optically combine the modulated beams reflected from each device onto a single optical display. U.S. Pat. No. 4680579 suggests (FIGS. 5 and 7) a system of this kind in which separate color filters are placed in front of each mirror device, to produce different primary colored modulated output signals.

Inevitably, however, such filters result in considerable loss of optical power since only certain wave lengths are passed; for each of the primary color filters, light corresponding to the other two primary colors is effectively unused so that either three separate white light sources, or one white light source of considerable power, is required. In applications such as large displays, for use for example in cinemas, the electrical power required is in Kilowatts and thus as well as being wasteful of electrical power, the system of U.S. Pat. No. 4680579 would lead to considerable heat dissipation which makes realization of compact equipment difficult.

EP 0401912 provides an amplitude modulating active matrix display in which instead of color filters of the type which reject light outside their pass band, dichroic color splitters which split incident light into separate color components which are spatially separated. It is thus possible to use a single optical source, split into separate primary component colors, each component color beam being modulated by a separate spacial modulator array and then recombined by an equivalent color combiner device. EP 0363763 includes a similar disclosure.

However, color splitters (such as dichroic optical devices) tend to have a spectral response which depends upon the angle of incidence of light upon the splitter so that with a spatial light modulator which alters the optical axis of the beam, for example, angularly, (as is usually the case) the splitter is placed normal to one beam (the incident beam of the beam deflected by the spacial modulator array) the recombination will not spectrally match the original split and a color shift may be introduced into the recombined signal; further, instead of being properly recombined, light may escape the combiner and this ambient light tends to degrade the optical output of the apparatus.

In one aspect, we solve this problem by providing that the angle at which the incident beam impinges upon the splitter is equal to the angle at which the reflected beam impinges upon the combiner.

In another aspect of the invention, we solve this problem by providing that the surfaces of the splitter and combiner are parallel and that they are inclined at an angle lying between the normal to the incident and deflected beams.

A further problem with the system of EP 0401912 is that an essential constraint on such a display system is that the optical path length of the color components signals must be equal (assuming that the arrays are of identical shape) so that identical modulated signals can be effectively recombined. This requirement, together with the geometry of deformable mirror device illumination, leads to an arrangement of splitter and combiner devices occupying a substantial spacial volume. In some applications this is undesirable.

We solve this problem by using a single surface to perform both a splitting and a combining function. This permits a considerable reduction in the volume of the optical unit. Also, it enables the path lengths for each color component signal to be greatly reduced, thus simplifying the lens system required for display projection. Further, since the number of optical components is reduced the alignment task is simplified. Moreover, since a single component splits and combines the same color signals, the possibility of spectral differences in the recombined signal due to differences between components is reduced.

EP 0450952 (published after the priority date of the present application) discloses a color picture display system in which charge image spatial light modulators (which are neither active matrix devices nor angular deflection devices) are employed together with dichroic filters which both split and combine the light beam.

Other aspects of the invention, together with preferred features and advantages, will be apparent from the following description and appended claims.

BRIEF DESCRIPTION OF THE DRAWINGS

The invention will now be described, by way of example, with reference to the accompanying drawings in which.

DESCRIPTION OF THE PREFERRED EMBODIMENTS

Figure 1:
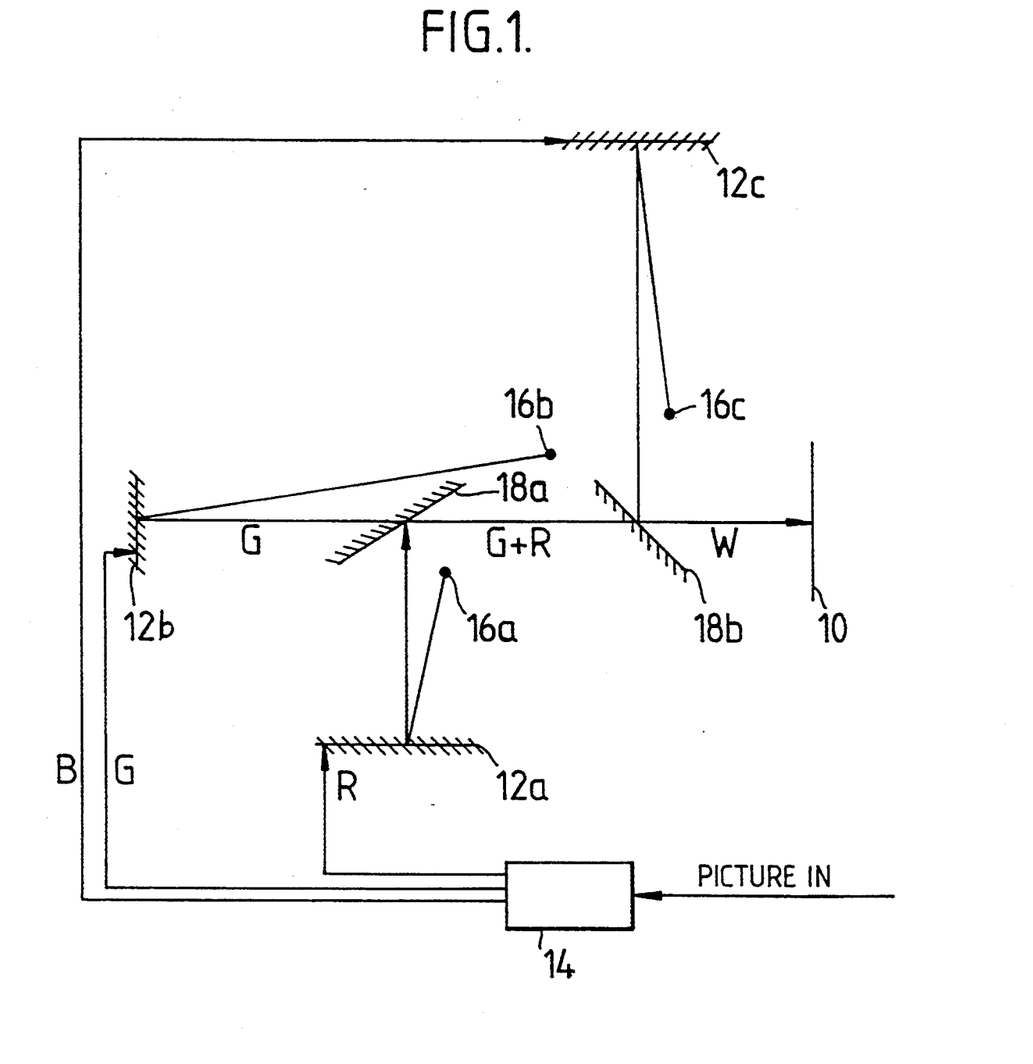
FIG. 1 shows schematically the elements of a color optical output system.

Referring to FIG. 1, an output system comprises a projection plane 10 receiving the combined color output signal. In a display system, as described hereafter, the projection plane comprises an illuminatable display screen 10. Three deformable mirror device spacial light modulator arrays 12a, 12b, 12c are controlled by separate color control signals. Each color control signal relates to a primary color (red, green and blue). The signals are supplied from a signal generator 14, which is supplied with a composite color video signal.

Illumination sources 16a, 16b, 16c provide an illumination signal for each corresponding modulator array 12a, 12b, 12c. The modulated signals from the modulators 12a, 12b, 12c are different colors; in the prior art this is achieved by either using different colored light sources 16a, 16b, 16c, or by positioning a color filter in the path from each source 16 to the respective modulator array 12 or after the modulator array 12.

The colored signals from each modulator array 12a, 12b, 12c are then re-combined by a pair of combining elements 18a (combining the signals from 12a and 12b) and 18b (adding to this combination the signal from the modulator 12c). The combined beam is imaged onto the display screen 10 by a display lens arrangement (not shown).

Figure 2:
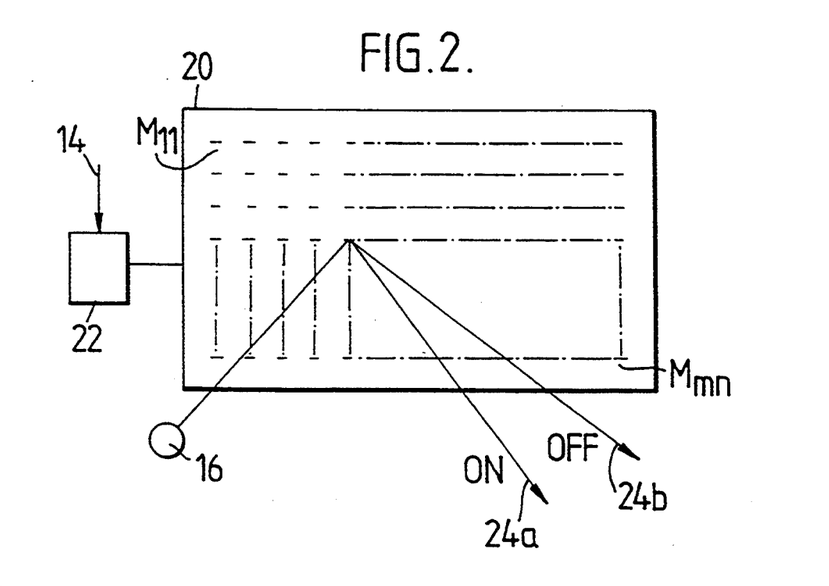
FIG. 2 shows schematically the structure of a spacial light modulator array device in one embodiment of the invention.

Referring to FIG. 2, a deformable mirror device array for use in the invention comprises an array of typically m x n deflectable mirror devices; typically, on the order of 500×500 devices for a low resolution display or 2000×2000 devices for a high resolution display. The array 20 is connected to an addressing circuit 22 which receives the color signal from the circuit 14, and addresses each of the respective reflectors $M_{11}$–$M_{mn}$, as described in our earlier International application number PCT/GB92/00002 dated Jan. 4, 1992 (Agents ref. 3203299). Each reflector is thus operated between one of two reflection states corresponding to different reflector positions; an "on" state in which reflected light is directed in a first path 24a and an "off" state in which light is directed in a second path 24b. The second path 24b is disposed to lie away from all optical components of the system, and will not be described in greater detail. Thus, when viewed along the "on" path 24a, at an instant the array 20 displays a two dimensional image, those modulators which are set to a first deflection state appearing bright and those which are set to a second deflection state appearing dark.

Figure 3:
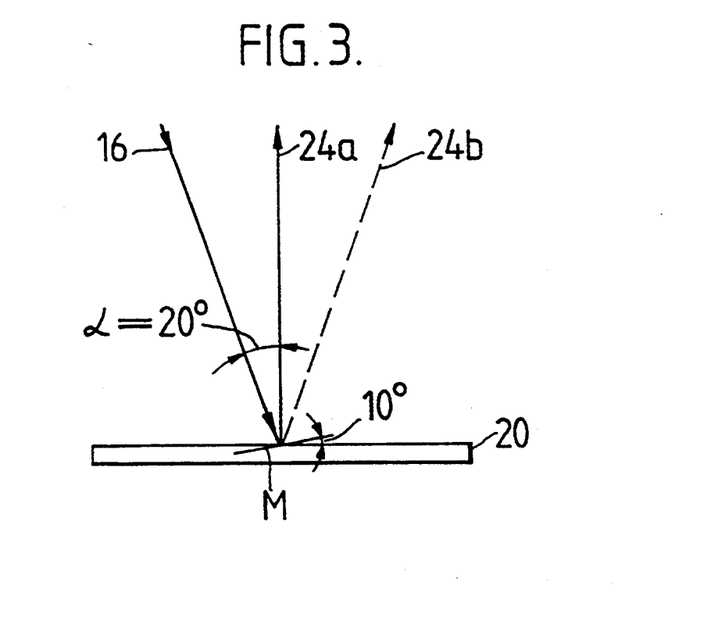
FIG. 3 shows schematically the optical illumination of a device of FIG. 2.

Referring to FIG. 3, the angle through which each reflector is deflected between the two states is relatively small and thus, in order to achieve good discrimination between the two states the incident light beam from the source 16 is directed towards the array 20 at an angle $\alpha$ (from the normal to the display) of around 20 degrees. When an individual reflector device M is lying parallel to the plane of the array 20, the incident beam is reflected at a corresponding angle of 20 degrees to the normal along path 24b, but when the control signal from the addressing circuit 22 sets the deflector M into a second deflection state at an angle to the plane of the array 20, the incident beam is reflected out along the normal angle to the array on the path 24a.

Figure 4:
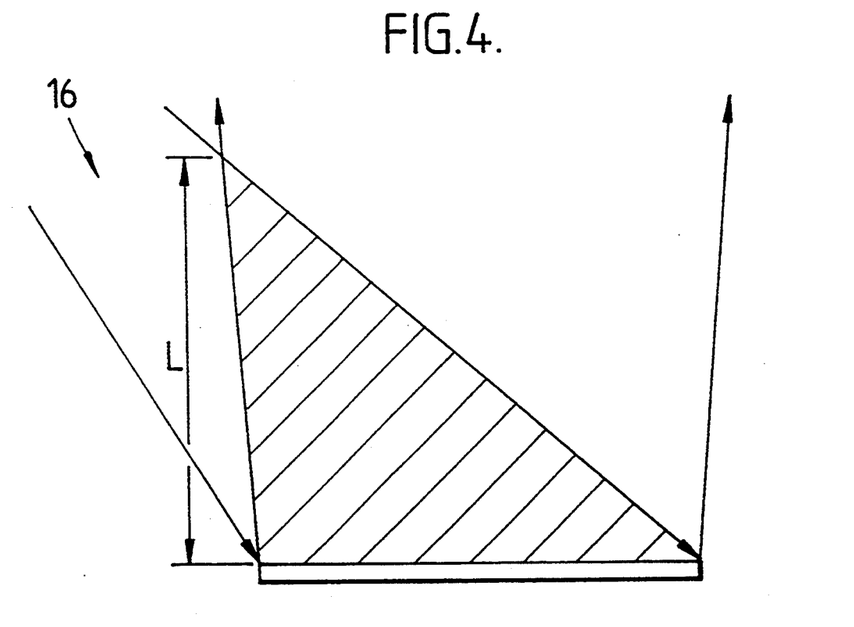
FIG. 4 shows an alternative to FIG. 3.

Referring to FIG. 4, the beam from the source 16 is essentially conical and illuminates the entire array 20. Likewise, the reflected beam 24a is also conical and wide and thus the incident and reflected beams overlap each other to a substantial distance L from the array 20.

Figure 5:
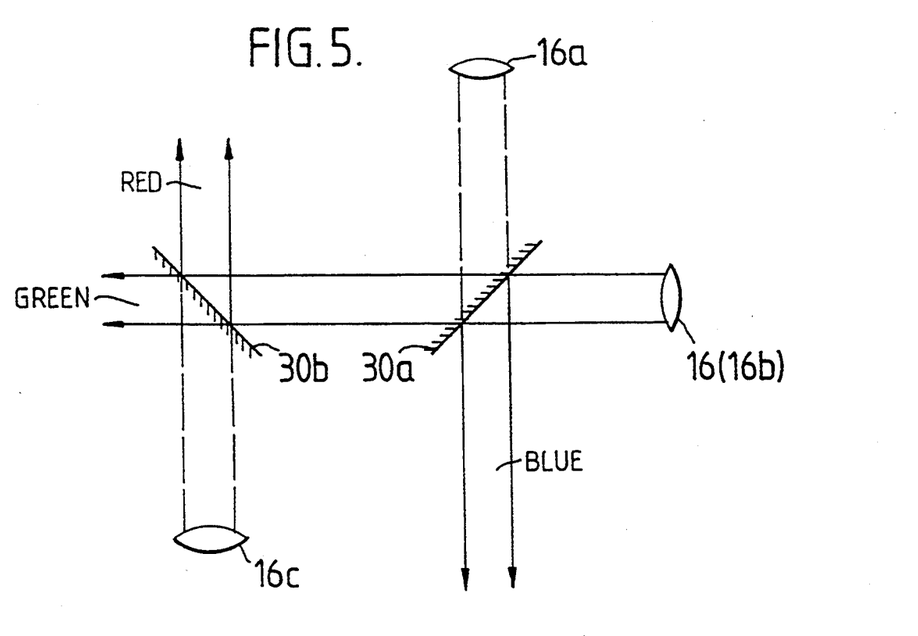
FIG. 5 shows schematically a splitter system of the invention.

Referring to FIG. 5, in systems according to the invention, the three light sources 16a, 16b, 16c shown in FIG. 1 are realised as virtual light sources derived from a single white light lamp 16. A pair of splitters 30a, 30b are provided to separate the color components of the white beam from the lamp 16; each splitter 30a, 30b comprises a dichroic mirror element disposed, at an inclined angle, across the beam from the lamp 16.

As is known in the art, a dichroic filter element acts so that an incident beam is split into two beams of different colors, one being reflected and the other refracted; it comprises multiple thin layers (on the order of fractions of an optical wave length). The two beams have complementary spectral contents; in one type of dichroic mirror, illustrated in FIG. 6a, optical frequencies below a predetermined frequency are transmitted whilst those above are reflected; in a second type, frequencies below a predetermined frequency are reflected whilst those above are transmitted. Examples are the types DT yellow (which reflects blue light) and DT cyan (which reflects red light) available from Balzers AG.

The device 30a therefore has the characteristics shown in FIG. 6a and accordingly reflects blue wave lengths to form a deflected beam appearing to originate from a virtual blue source 16c. Red and green wave lengths are transmitted. The second splitter device 30b has the characteristic illustrated in FIG. 6b and consequently reflects red optical wave lengths to a reflected beam appearing to originate from a virtual source 16a. The beam transmitted through the splitter 30b consequently comprises green wave lengths and appears to originate from the position of the lamp 16.

The use of such dichroic spacial wave length splitters has several advantages; firstly, there is little waste of optical power since the splitters have an efficiency approaching 90% and all portions of the optical spectrum are used, and secondly, the transmitted and reflected beams from each splitter are essentially complementary in frequency content so that when recombined the splitting will not have introduced spurious colorations and the combined beam will have approximately the spectral distribution of the white beam from the light source 16, modulated by the color of the picture to be displayed.

When this illumination arrangement is employed in the system shown in FIG. 1, the combiners 18a, 18b are conveniently also dichroic elements; the combiner 18a corresponds to the splitter 30b and consequently efficiently reflects the modulated red beam from the array 12a into the same path as the efficiently transmitted green beam from the array 12b, and the combiner 18b corresponds to the splitter 30a and consequently efficiently reflects the modulated blue beam from the array 12c into the transmitted path of the green and red beam from the combiner 18a to produce a combined white beam for imaging onto the display screen 10.

However, referring once more to FIGS. 3 and 4, because of the narrow angle of incidence required for deformable mirror devices the length 1 from the array 20 over which the incident and reflected beams overlap is substantial. In general, combiner and splitter components are not inclined at the same angle and hence must be placed outside this distance L so that the splitter does not affect the reflected beam and the combiner does not affect the incident beam. This embodiment of the invention therefore requires long optical paths in the system of FIG. 1.

Figure 6:
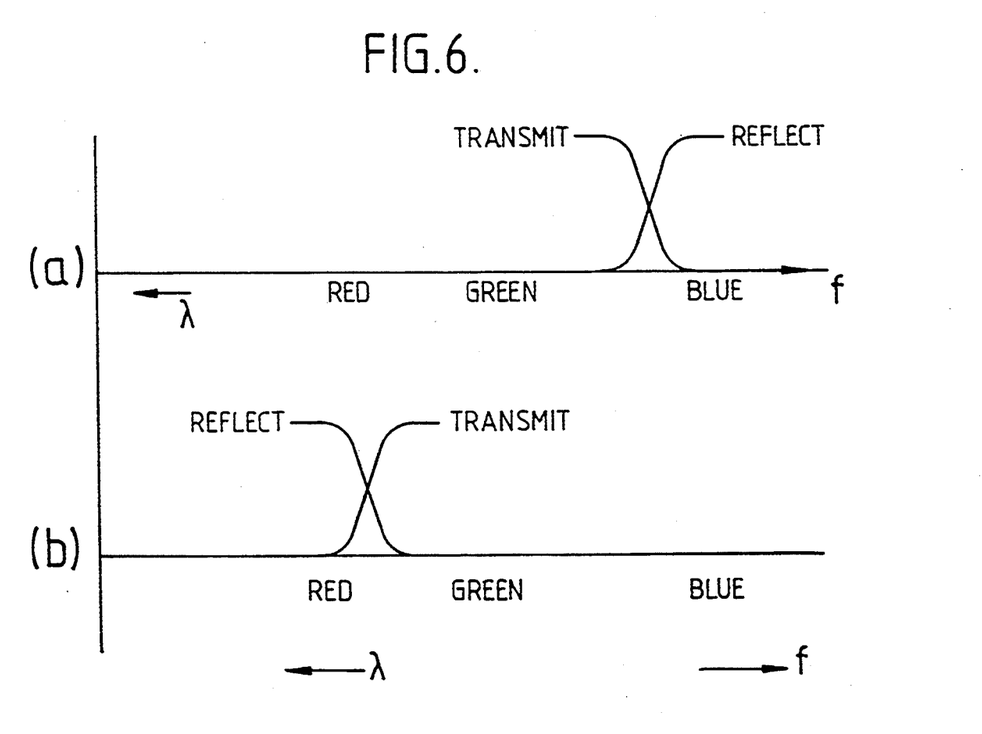
FIG. 6A to 6B shows schematically the optical behaviour of splitter elements employed in FIG. 5.
Figure 7:
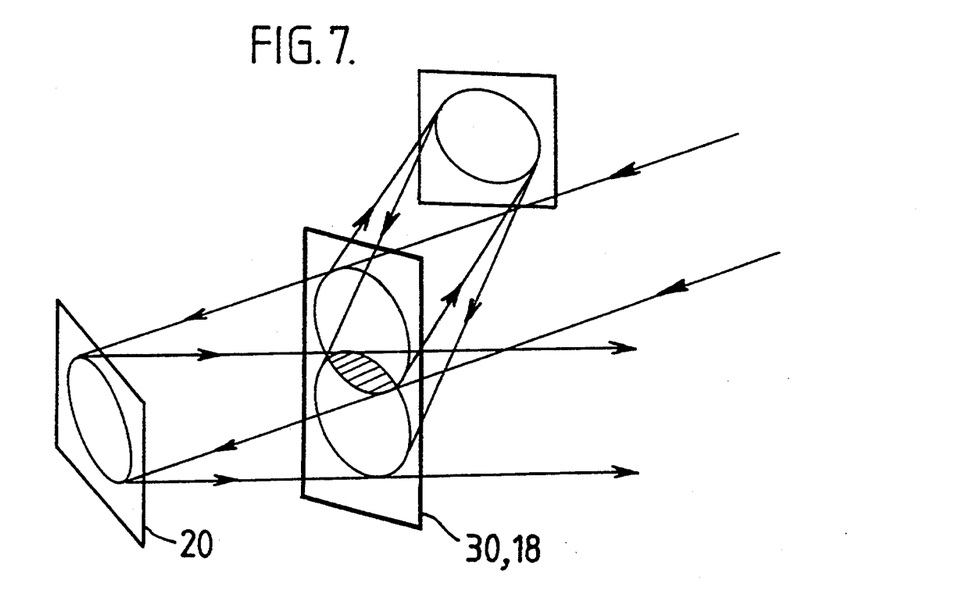
FIG. 7 shows schematically the passage of beams through a splitter element of FIG. 5.

Referring to FIG. 7, in a preferred aspect of the invention, the splitter 30a and combiner 18b form a single surface, as do the splitter 30b and combiner 18a. The single surface can thus be placed within the overlapping incident and reflected beams without causing difficulty. Although FIG. 6 shows only the passage of a single ray, it will be appreciated that the widths of the incident and reflected beams are such that they very substantially overlap at the position of the splitter/combiner elements, as shown in FIG. 8.

Figure 8A:
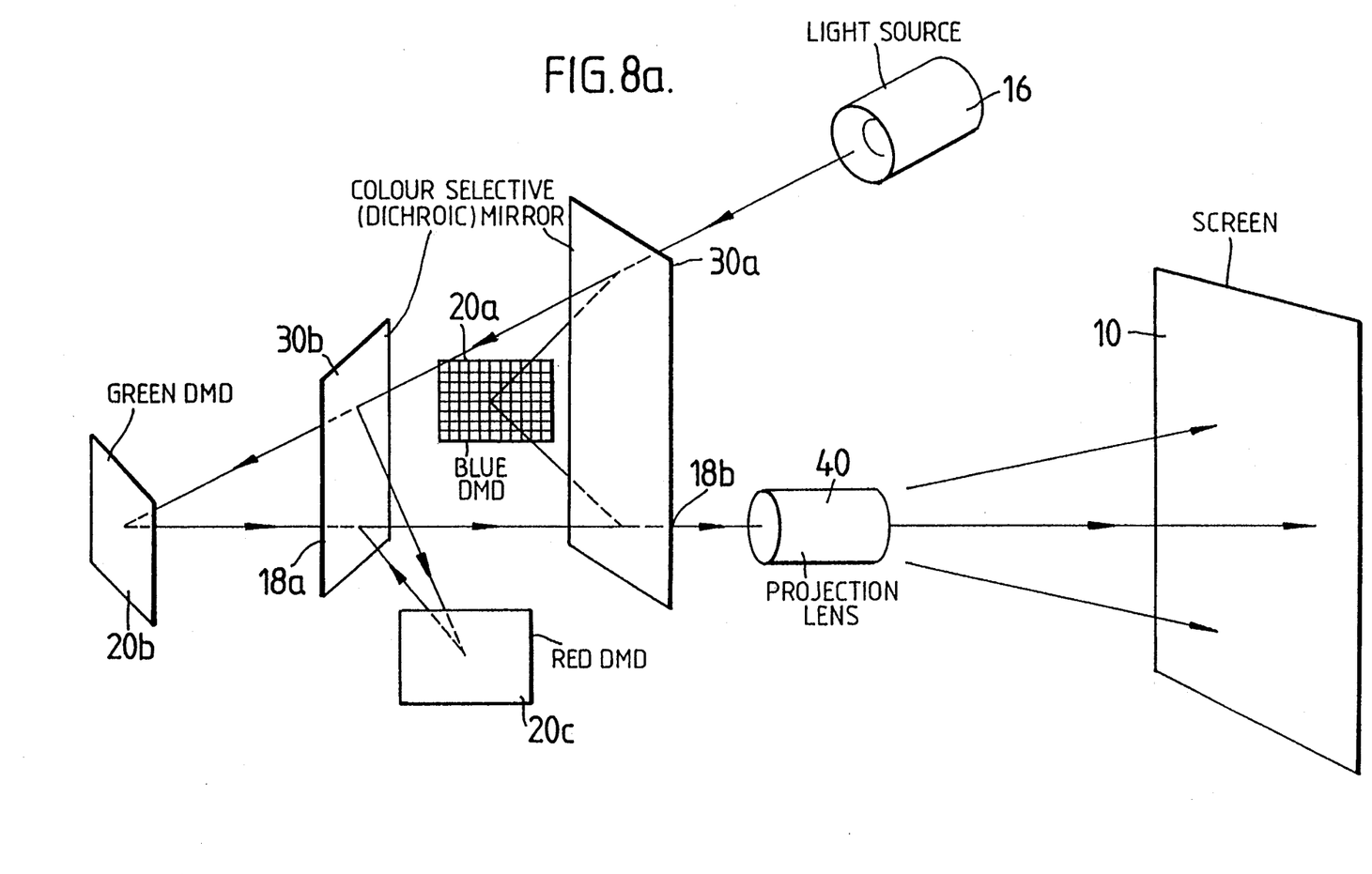
FIG. 8A shows a perspective view of one embodiment of the invention.
Figure 8B:
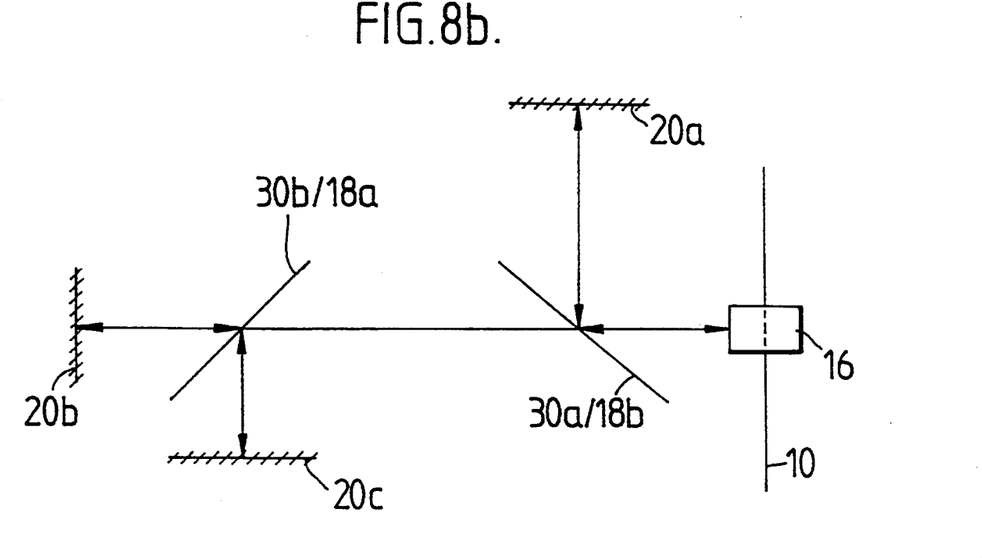
FIG. 8B and 8C show corresponding plan and elevation views.
Figure 8C:
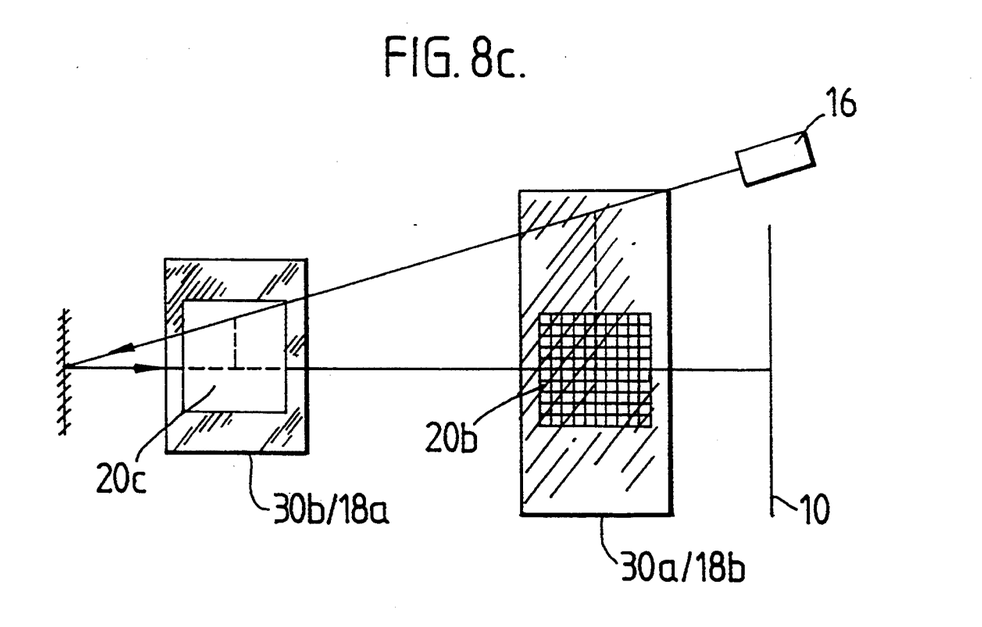

Referring to FIGS. 8a to 8c, a white light source 16 comprising a high power lamp generates light along an incident light path which is in a plane normal to that of a display screen 10. For example, the light source 16 may be positioned above the display screen 10. A planar digital mirror display device 20b is positioned spaced apart from and in a plane parallel to the screen 10, and the light source 16 is arranged to illuminate the array 20b at an angle of 20 degrees to its normal axis. The array 20b is arranged to deflect the incident beam to illuminate the screen 10 via a projection lens 40.

Positioned within the path of the incident and deflected rays are a pair of upright splitter/combiner mirrors 30a/18b, 30b/18a which are at an inclination, rotated about the vertical axis relative to the plane of the screen by some angle (typically between 20 and 70 degrees, and preferably 45 degrees) such as to reflect the incident beam to further digital mirror deflector arrays 20a, 20c.

The arrays 20a, 20c are positioned at a distance such that the optical path traversed from each array 20a–20c to the screen 10 is the same. The first splitter/combiner mirror has the characteristic shown in FIG. 6a and consequently reflects a blue light component beam to a digital mirror display array 20a which is modulated in response to the blue color component of the picture to be displayed. Consequently, the reflected beam is deflected vertically by 20 degrees but is substantially horizontally unmodified. The splitter 30a transmits red and green wave length components substantially unattenuated.

The second splitter 30b reflects red wave lengths to a second digital mirror device array 20c which is modulated in response to the red color component signal of the picture to be reproduced and consequently deflected 20 degrees vertically. The second splitter 30b allows the green optical wave lengths to pass substantially unattenuated, to be deflected by a third digital mirror device array 20b responsive to the green color component signal of the picture to be reproduced.

The modulated green beam passes unattenuated back through both splitter/combiners through the projection lens 40 and onto the screen 10. At the first splitter/combiner reached, 18a, the modulated beam from the red digital mirror device array 20c is reflected into the same path as the modulated green beam and at the second splitter/combiner 30a/18b the modulated signal from the blue digital mirror device array is reflected back into the same path so that the signal at the projection lens 40 comprises the recombined color signals.

Figure 9:
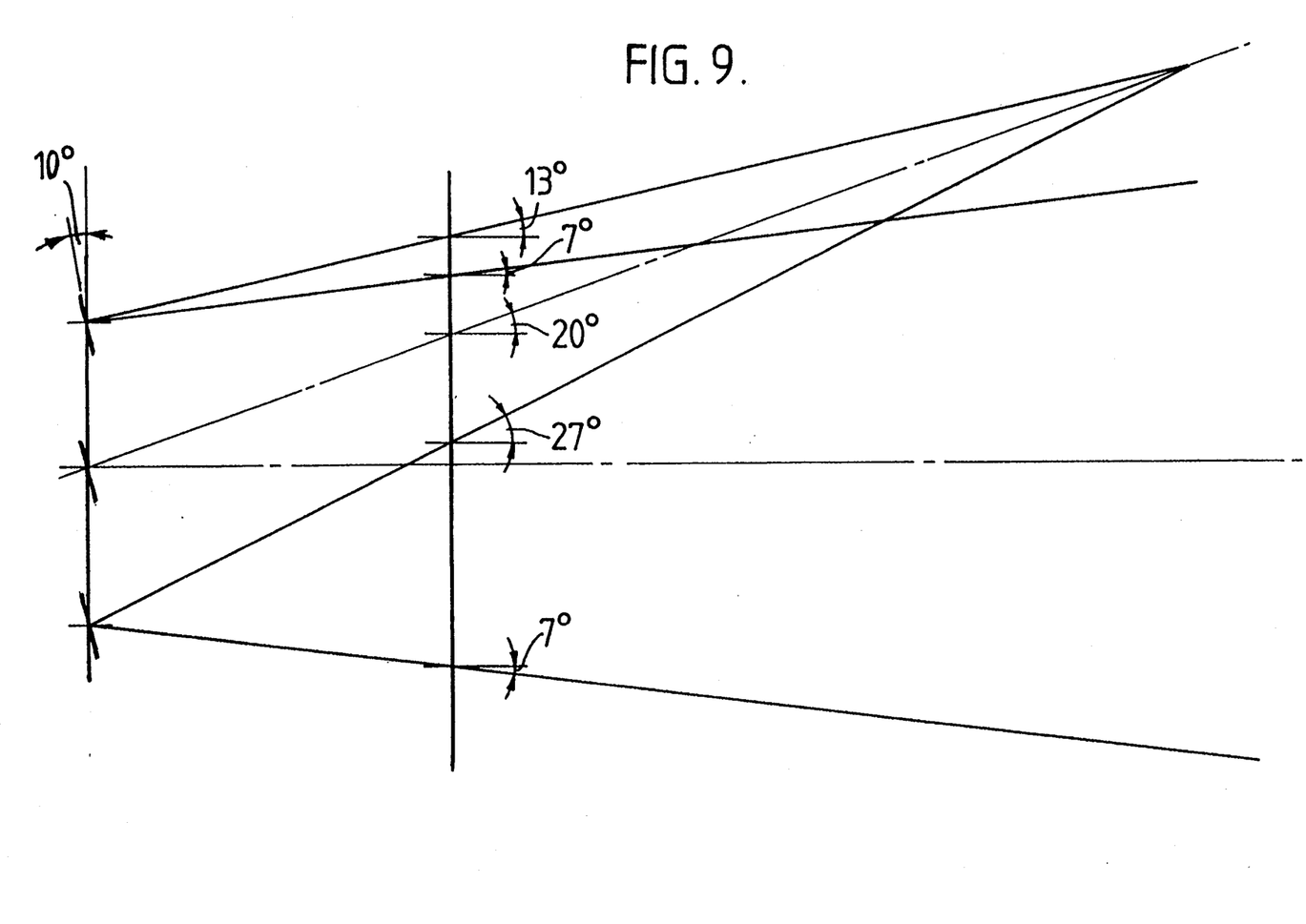
FIG. 9 shows a detail of FIG. 8.

The spectral responses illustrated in FIGS. 6a and 6b are in fact dependent upon the angle of incidence of light upon the dichroic mirror in question. The spectral position of the transition (or transitions) between reflection and transmittance and/or the magnitude of either can therefore be different for two beams incident upon the mirror from different angles. Thus, even if the splitter and combiner elements are identical (as is the case if the two are combined as a single dichroic mirror as above), the recombined beam can differ spectrally from the spectral sum of the modulated color component signals from each array 20a, 20b, 20c, and consequently an unwanted color cast can be introduced into the reproduced picture. Further, stray light caused by unwanted transmission rather than reflection, or vice versa, through a combiner or splitter tends to reduce the contrast ratio available from the apparatus since it will usually eventually find its way to the display screen 10. In the apparatus illustrated in FIGS. 8a–8c, if, as shown, the splitter/combiners 30a/18b, 30b/18a comprise vertical planes then precisely this problem arises since whilst functioning as splitters, incident light is transmitted and reflected at a vertical angle of 20 degrees whereas modulated light is transmitted and reflected at a vertical angle normal to each splitter/combiner. Thus, the proportion of each color signal in the combined signal display differs from the original proportions split by the splitters 30a, 30b. Referring to FIG. 9, this problem is particularly noticable with a divergent beam of the kind which may be employed in the embodiment of FIG. 8a due to the short path lengths enabled by that embodiment, because not only does the angle of the incident beam differ from 50a, 50b, 50c differ from the angle of the modulated beam 51a, 51b, 51c in each case but also the ratio of the angles of each incident beam 50a to its corresponding reflected beam 51a will differ from the top to the bottom of the picture. A variable degree of color cast within the picture may thus be generated, which is subjectively undesirable.

Figure 10:
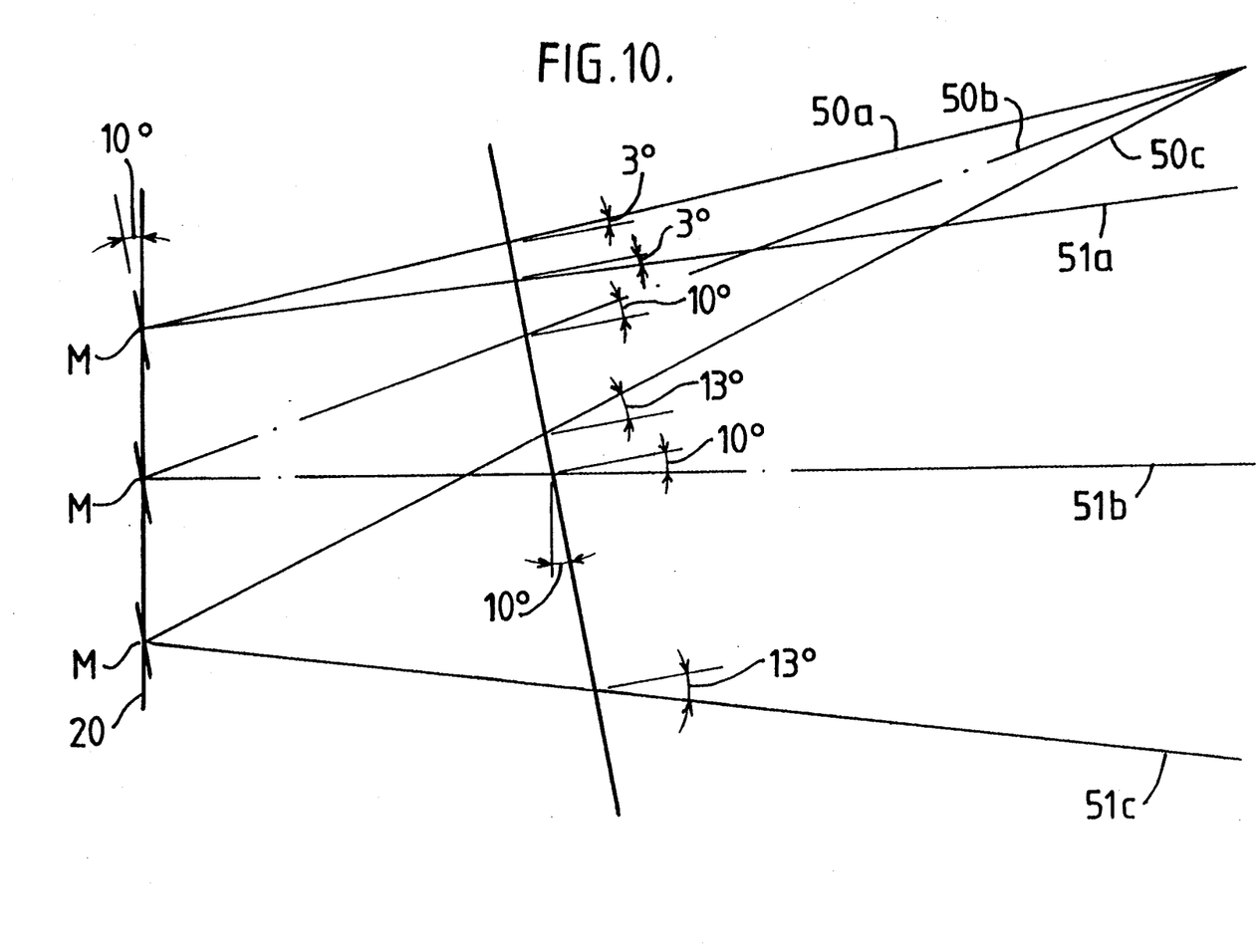
FIG. 10 shows a preferred embodiment of the invention.

Referring to FIG. 10, we solved this problem by inclining the splitter/combiner in the vertical plane at an angle equal to half the angle, in the vertical plane, between the incident beam from the light source 16 and the reflected beam from the array 20. In this case, with a modulation angle of 20 degrees, the mirror is consequently inclined at 10 degrees. It will be apparent from FIG. 10 that, although the angles at which the incident and reflected beams 50a–50c, 51a–51c impinge upon the splitter/combiner vary, in each case the angle between each incident and reflected beam is the same so that the color balance of the recombined signal is correct. Because the angles of impingence increase towards the lower part of the combiner, and consequently of the picture reproduced on the display screen 10, some slight variation of intensity across the picture will occur, but this is generally acceptable.

Referring once more to FIG. 8a, because in this embodiment the planes of the splitter/combiners are now no longer vertical the two arrays 20a, 20c must also be rotated somewhat.

The use of color selective mirrors such as dichroic mirrors makes efficient use of the white light beam (up to 90% of which may usefully be employed) compared to the use of separate white light beams for each array (in which case, using typical filters, the blue light uses only 11% of the available energy).

Whilst the invention has been described with reference to a display device it will be equally apparent that it could be applied to a color printer, where the display screen 10 is replaced by means for fixing the image produced onto a medium.

Equally, other types of spacial frequency splitter components than dichroic mirrors could be employed.

We claim:

1. Color optical output apparatus comprising a spacial light modulator device, means for illuminating the device on an incidence path such that the device produces a spacially modulated deflected beam on a deflection path, angularly displaced from said incidence path by a deflection angle, and splitter and combiner mirror means positioned in said incidence and deflection paths, the mirror means being inclined at an acute angle to the normals to said incidence and deflection paths, and inclined at an angle about halfway between the said normals, the deflection angle being in a different plane to the plane in which the incident beam is split by said mirror means.

2. Apparatus according to claim 1, in which the plane containing the deflection angle is approximately normal to the beam splitting plane.

3. Apparatus according to claim 1, in which the mirror means comprises a single mirror surface lying across the incidence and deflected paths.

4. Apparatus according to claim 3, wherein the mirror surface comprises a dichroic mirror.

5. Apparatus according to claim 1 wherein the mirror surface comprises a dichroic mirror.

6. Color optical output apparatus comprising:
a polychromatic beam source;
an output plane onto which an output color picture is imaged;
a plurality of spacial light modulator devices each controllable in dependence upon a different color component signal;
splitter means for splitting the beam from said source into incident optical color component beams, and directing each such component beam to a respective said device to be modulated thereby and to produce a deflected modulated optical color component beam; and
combiner means for recombining the modulated optical color component beams to provide a combined polychromatic beam to be directed to said imaging plane;
wherein said splitter means and said combiner means share a common surface, the deflection angle between the incident and deflected beams being such that the incident and deflected beams substantially overlap and the splitter and combiner means are positioned in the region in which said incident and deflected beams overlap.

7. Apparatus according to claim 6, in which said splitter means and said combiner means comprise dichroic mirrors.

8. Apparatus according to claim 6 or claim 7, in which said dichroic mirrors are disposed in the path of said source beam at an angle such as to deflect a color component of said source beam in a plane different to that in which said devices deflect said source beam.

9. Apparatus according to claim 6, in which the devices are adapted to angularly redirect the beams incident thereon.

10. Apparatus according to claim 6, in which the devices comprise active matrix devices each comprising a plurality of individually addressed modulator elements.

11. Apparatus according to claim 6, in which the devices each comprise an array of individually deflectable mirrors.

12. Apparatus according to claim 6, comprising three devices each controlled to correspond to a primary color.

13. A display system comprising apparatus according to claim 6, and a display screen onto which the modulated beam is projected.

14. A cinema projection system comprising apparatus according to claim 9.

* * * * *

UNITED STATES PATENT AND TRADEMARK OFFICE
CERTIFICATE OF CORRECTION

PATENT NO. : 5,424,868
DATED : June 13, 1995
INVENTOR(S) : Fielding et al

It is certified that error appears in the above-indentified patent and that said Letters Patent is hereby corrected as shown below:

Title page, item [22] should read:

-- PCT Filed:   Jan. 23, 1992 after item [22] should read:

[86]  PCT No.: PCT/GB92/00132

§ 371  Date: Sept. 16, 1993

§ 102 (e)  Date: Sept. 16, 1993

[87]  PCT Pub. No.: WO 92/13424

PCT Pub. Date: Aug. 6, 1992

Signed and Sealed this

Fourteenth Day of November, 1995

Attest:

BRUCE LEHMAN

*Attesting Officer*       *Commissioner of Patents and Trademarks*